Patented Aug. 25, 1925.

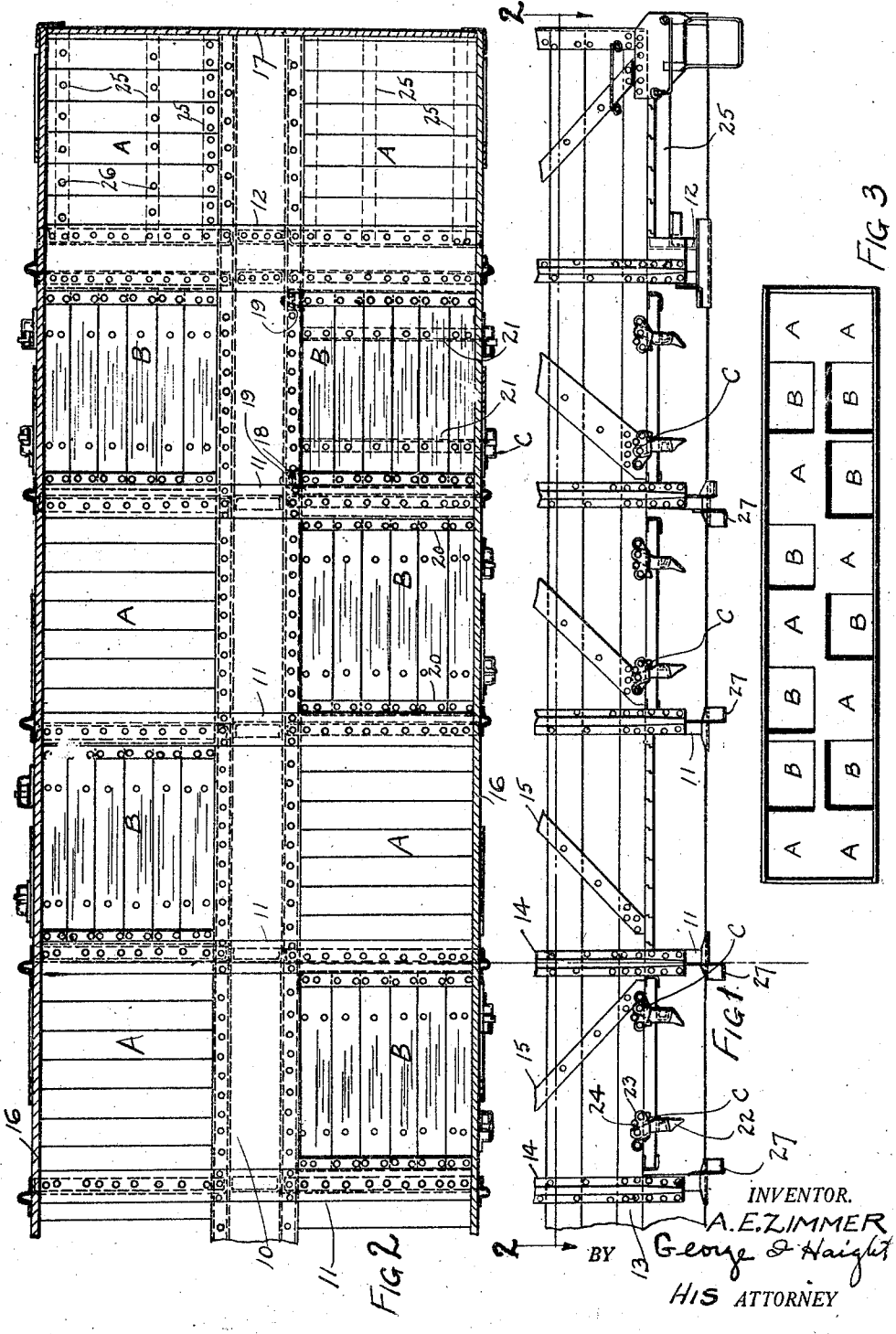

1,550,865

UNITED STATES PATENT OFFICE.

ALBERT E. ZIMMER, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP CAR.

Application filed January 12, 1925. Serial No. 1,719.

*To all whom it may concern:*

Be it known that I, ALBERT E. ZIMMER, a citizen of the United States, residing at Chicago, in the county of Cook and State of Illinois, have invented a certain new and useful Improvement in Dump Cars, of which the following is a full, clear, concise, and exact description, reference being had to the accompanying drawings, forming a part of this specification.

This invention relates to improvements in dump cars.

The general purpose of my invention is to provide a dump car having an improved arrangement of dump doors broadly similar to that disclosed in U. S. Patent No. 1,455,520, granted to Argyle Campbell, May 15th, 1923.

An object of the invention is to increase the strength of the car in certain parts thereof, by providing fixed floor sections which operate to brace the car from side to side, and to disclose the dumping doors in such a manner as to effectively direct lading away from the fixed floor portions.

A further object of the invention is to provide a novel arrangement of dumping doors and fixed floor sections, which afford adequate dumping area with a reduced number of doors, and to dispose the doors and the fixed floor sections in such a relation as to obtain increased strength.

In the drawings forming a part of this specification, Figure 1 is a fragmentary side elevational view of a dump car showing my improved construction; Figure 2 is a sectional view of the construction on the line 2—2 of Figure 1 showing a plan view of the dump car illustrated in Figure 1, slightly more than one-half the length of car being shown; Figure 3 is a diagrammatic top plan view of the entire car illustrated in Figures 1 and 2.

In said drawings, the car is shown as provided with a longitudinal center sill 10, transverse members or crossbeams 11, body bolsters 12, channel side sills 13, vertical stakes 14, and diagonal braces 15, side walls 16, and end walls 17.

Referring more particularly to Figures 1 and 2, it will be noted that the bottom of the car is composed of fixed floor sections A, and drop doors B, said drop doors being disposed intermediate the cross-members 11 of the car. It also will be observed that the floor intermediate the bolster 12 and the corresponding end of the car, shown in Figure 2, is formed of the fixed transversely alined end floor sections and immediately adjacent thereto, and on opposite sides of the center of the car, are the transversely aligned floor doors B, which are so located as to induce flow of lading away from the adjacent fixed floor sections A. Intermediate said transversely aligned doors adjacent the end floor sections, and the opposite end of the car, I preferably provide two doors on each side of the car, alternated with two fixed floor sections A, said fixed floor sections A on one side of the center sill being disposed transversely opposite the floor doors B on the other side of the center sill, so that a portion of the bottom of the car will have alternated and staggered floor sections A and pivoted doors B, as shown in detail in Figure 2. At the end of the car opposite to that shown in Figure 2, are provided transversely aligned floor sections A, similar to the transversely alined sections A hereinbefore referred to, and adjacent such floor sections are provided transversely aligned doors B, similar to those first mentioned, the arrangement of the entire bottom of the car being illustrated in Figure 3.

As shown in Figure 2, the drop doors B, are preferably pivoted along their inner edges as indicated at 18 to suitable hinge butts 19, preferably attached to the center sill. Each of the doors B preferably consists of a plurality of longitudinally extending boards or planks secured together by a plurality of edge strips 20, and braced on the underside by a pair of transversely extending beams 21—21 each of said beams 21—21 is adapted at its outer end to cooperate with a door retaining device C of any suitable form, which may consist of a latch 22 pivoted in a suitable housing 23, and locked relatively thereto by a pivoted cam 24. The downward movement of the doors B is limited by means of door stops 27, which are preferably carried by the crossbearers 11.

The disposition of the door and floor sections in such a manner as to provide a fixed floor throughout the width of the car for an appreciable distance longitudinally thereof, materially strengthens the underframe and lessens the racking tendency, inasmuch as it is possible to brace the various parts beneath the floor sections. Braces such as shown at 25 operate to stiffen the car intermediate the bolsters and the ends of the car, and also perform the function of beams to carry the floor boards, the floor boards being secured to the beams 25 by means of bolts 26. The arrangement of the three doors B, disposed adjacent to each bolster at opposite end of the car provides a construction well adapted for the ready discharge of material, as the opening of any one door of the combination of three doors when the remaining doors are closed will direct material to the discharge opening from three directions, while the opening of all three doors simultaneously, or the two transversely aligned doors, serves to provide a maximum dumping opening adjacent the fixed floor sections, thus providing adequate bracing means without sacrificing the dumping efficiency of the car. The arrangement of the doors in the manner shown permits the disposition of fixed floor sections to brace and strengthen the structure at the point of intersection of the longitudinal center sill and transverse crossbeams, and affords increased strength and generous dumping area.

While I have herein shown and described what I now consider the preferred manner of carrying out the invention, the same is merely illustrative and I contemplate all changes and modifications that come within the scope of the claims appended hereto.

What I claim is:

1. In a dump car including a bottom having certain portions thereof formed of transversely aligned floor doors, and having other portions of the bottom of said car formed of alternated and staggered dumping doors and fixed floor sections.

2. In a dump car the combination with the center sill and body bolsters, of transversely aligned dumping floor doors disposed on each side of the center sill adjacent each of the body bolsters, and alternated and staggered dumping doors and fixed floor sections disposed intermediate said transversely aligned floor doors.

3. In a dump car including a bottom having portions thereof formed of transversely aligned fixed floor sections, and transversely aligned floor doors adjacent said fixed floor sections; the bottom of said car having other portions provided with staggered dumping doors and fixed floor sections.

4. A dump car having side and end walls, a bottom, a center sill, and bolster; said bottom having fixed floor sections disposed on either side of the center sill intermediate the bolster, and the end of the car, transversely aligned dumping doors disposed on each side of the center sill and adjacent the bolster, said bottom also having alternated and staggered dumping doors and fixed floor sections included therein.

5. A dump car having sides, a center sill, cross members spaced from each other longitudinally of the car and connecting said sides, a floor having dumping openings and fixed floor sections intermediate the cross members, some of said dumping openings being transversely opposite each other, and others being disposed transversely opposite the fixed floor sections.

6. In a railway car, the combination with a member extending transversely between the sides of the car; of a longitudinal member intersecting the same providing four adjacent spaces; dumping doors disposed in three of such spaces and a fixed floor section disposed in the fourth space.

7. In a dump car including a bottom having certain portions thereof formed of a plurality of floor doors and a fixed floor section, certain of said doors being disposed adjacent to and in substantial alignment with each other, and another of said doors being disposed at an angle to said first doors, and adjacent to and in substantial alignment with one of the same, the fixed floor section being disposed in substantial alignment with said latter door, and with the other of said first mentioned doors.

8. In a dump car having sides, ends and a bottom; fixed floor sections adjacent the ends of the car, transversely aligned floor doors adjacent said fixed floors, and dumping doors alternated and staggered with respect to fixed floor sections disposed intermediately of the transversely aligned doors.

In witness that I claim the foregoing I have hereunto subscribed my name this 7th day of January, 1925.

ALBERT E. ZIMMER.